(12) United States Patent
ElShishiny et al.

(10) Patent No.: US 7,272,264 B2
(45) Date of Patent: Sep. 18, 2007

(54) SYSTEM AND METHOD FOR HOLE FILLING IN 3D MODELS

(75) Inventors: Hisham Emad El-Din ElShishiny, Guiza (EG); Fausto Bernardini, New York, NY (US); Holly Edith Rushmeier, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 10/659,937

(22) Filed: Sep. 11, 2003

(65) Prior Publication Data

US 2005/0057561 A1    Mar. 17, 2005

(51) Int. Cl.
*G06K 9/40* (2006.01)
(52) U.S. Cl. ............ 382/254; 382/154; 382/274; 382/275; 345/419; 345/616; 345/653
(58) Field of Classification Search ............ 382/154, 382/260, 274, 275, 285, 291; 345/419, 616, 345/653, 664, 679
See application file for complete search history.

(56) References Cited

U.S. PATENT DOCUMENTS

| | | | |
|---|---|---|---|
| 6,273,596 B1 * | 8/2001 | Parkyn, Jr. ............ | 362/522 |
| 6,300,958 B1 * | 10/2001 | Mallet ............ | 345/442 |
| 6,697,538 B1 * | 2/2004 | Angenent et al. ............ | 382/285 |
| 6,718,290 B1 * | 4/2004 | Szymczak et al. ............ | 703/2 |
| 7,030,968 B2 * | 4/2006 | D'Aligny et al. ............ | 356/5.01 |

OTHER PUBLICATIONS

Paul J. Besl, Neil D. McKay; A Method for Registration of 3-D Shapes; IEEE Transactions on Pattern Analysis and Machine Intelligence; vol. 14 No. 2, 1992; pp. 239-256.

F. Bernardini, J. Mittleman, H. Rushmeir, C. Silva, G. Raubin; The Ball-Pivoting Algorithm for Surface Reconstruction; IEEE Transactions and Visualization and Computer Graphics, vol. 5, No. 4; Oct.-Dec. 1999; pp. 349-359.

J. Davis, S. R. Marschner, M. Garr and M. Levoy; Filling Holes in Complex Surfaces using Volumetric Diffusion; IEEE Proceedings of the First International Symposium on 3D Data Processing Visualization and Transmission; Jun. 2002; 5 pages.

T. K. Dey and S. Goswami; Tight Cocone: A Water-tight Surface Reconstructor; SM'03, Jun. 16-20, 2003, Seattle, Washington; 8 pages.

J. C. Carr, R. K. Beatson, J. B. Cherrie, T. J. Mitchell, W. R. Fright, B. C. McCallum, T. R. Evans; Reconstruction and Representation of 3D Objects with Radial Basis Functions; ACM Siggraph 2001; Aug. 12-17, 2001, Los Angeles, CA; pp. 67-76.

(Continued)

*Primary Examiner*—Yosef Kassa
(74) *Attorney, Agent, or Firm*—Keusey, Tutunjian & Bitetto, P.C.; Rafael Perez-Pineiro, Esq.

(57) ABSTRACT

A method for hole-filling in 3D models includes identifying vertices adjacent to hole boundaries in a mesh of points on a digital image and constructing a signed distance function based on vertices adjacent to hole boundaries. A Radial Basis Function is fit based on the constructed signed distance function and evaluated on a grid, which include the hole. The points on the hole surface are extracted and meshed to fill the hole.

31 Claims, 9 Drawing Sheets

OTHER PUBLICATIONS

B. Curless and M. Levoy; A Volumetric Method for Building Complex Models from Range Images; 1996 ACM; pp. 303-312.

J. Verdera, V. Caselles, M. Bertalmio, G. Sapiro; Inpainting Surface Holes; Sep. 2003; 4 pages.

* cited by examiner

$$f(x_i, y_i, z_i) = 0 \quad (1)$$

$$i = 1, \ldots, n$$

$$f(x_i, y_i, z_i) = d_i \quad (2)$$

$$i = n+1, \ldots, N$$

$$s(x_i) = f(x_i) \quad (3)$$

$$i = 1, \ldots, N$$

where $x = (x, y, z)$ $$s(x) = p(x) + \sum_{i-1}^{N} \lambda_i |x - x_i| \quad (4)$$

where $x = (x, y, z)$ $$p(x) = c_1 + c_2 x + c_3 y + c_4 z \quad (5)$$

where $x = (x, y, z)$ $$\begin{pmatrix} A & P \\ P^T & 0 \end{pmatrix} \begin{pmatrix} \lambda \\ c \end{pmatrix} = \begin{pmatrix} f \\ 0 \end{pmatrix} \quad (6)$$

SYSTEM AND METHOD FOR HOLE FILLING IN 3D MODELS

BACKGROUND OF THE INVENTION

1. Field of the Invention

The present invention relates generally to methods and systems for processing image data, and more particularly, to methods and systems for computing complete surfaces from collections of coordinates representing points on an object's surface to generate images or for producing three-dimensional physical replicas or models of objects.

2. Description of the Related Art

The creation of three-dimensional digital objects by scanning real objects or scenes has become common practice in computer graphics applications, computer-aided design and manufacturing, urban planning, training simulations and building construction. Computer graphics applications include computer games, e-commerce and virtual museums, for example. Computer-aided design applications include scanning objects to be used as starting points for the design of new products. For example, features on existing objects can be numerically deleted and added to create new designs.

Computer-aided manufacturing applications include measuring an object to generate a physical replica using a three-dimensional hard copy device that produces objects by building layers of polymeric material, or sintering successive layers of metallic powders. Scans on the scale of the size of cities may be obtained for planning purposes such as assessing the impact of a new building or highway. In military applications, scanned cities or buildings may be used in virtual reality training simulations. In building construction, an existing building may be scanned to generate "as built" drawings to be used as a starting point for building remodeling. The following description has been restricted for convenience to techniques involving instruments that capture range images (in which each pixel value represents depth).

In general, a variety of techniques can be used to capture digital models of physical objects, including CAT scans and structure from motion applied to video sequences. Popular devices for capturing range images include laser triangulation systems (for objects less than a meter in largest dimension), laser time of flight systems (for objects up to a few hundred meters in size) and LIDAR (LIght Detection And Ranging), for scenes on the scale of the size of cities.

The basic operations necessary to create a digital model from a series of captured images may be as follows. After outliers (stray or unnecessary digital points) are removed from the range images, they are in the form of individual height-field meshes. A first step aligns these meshes into a single global coordinate system. In some systems this alignment is performed by tracking, for example, by a coordinate measurement machine for small-scale scanners, or by GPS (global positioning system) for large-scale scanners. In many systems, registration is performed by manual alignment. The alignment is then refined automatically using techniques such as the Iterative Closest Point (ICP) algorithm of Besl and McKay (See, "A method for registration of 3-D shapes"; by Besl, P. J. and McKay, H. D. in Patten Analysis and Machine Intelligence, IEEE Transactions, Vol. 14, Issue 2, February 1992, pp. 239-256), which is known in the art.

After registration, scans do not form a single surface, but often interpenetrate one another due to acquisition errors, primarily along the line-of-sight in each scan. These need to be corrected in a scan integration.

At the end of scan integration, there may be holes in the final surface, which are not physically present in the object. These holes are the result of the scanning device not being able to sample parts of objects. Areas may not be sampled if they are dark and so reflect little light, if they are partially hidden by another part of the object, or in the case of urban modeling, if objects such as buildings are hidden by trees, etc. These are artificial holes that result from the scanning process and are unacceptable in almost all applications that use 3D models.

In any computer graphics applications or visual simulation, large black regions on an object are unrealistic and distracting. In computer-aided design and manufacturing it is physically impossible to reproduce an object with an incomplete surface definition.

It should be noted that in addition to holes occurring because of problems with data collection, holes may also be created by users in a computer aided-design system. In editing an object a user may want to delete a feature such as a handle or embossed pattern that was part of the original object. In this case also, a method for filling the hole that is left is needed.

Prior art methods for hole-filling are either implemented as a post-processing operation, applied after surface reconstruction, or they are integrated into a surface reconstruction technique. For hole-filling as post-processing, a widely used approach is to triangulate each connected component of the surface's boundary, which results in filling each hole with a patch that has the topology of a disk. This works well for simple holes in almost flat surfaces, but for more complex cases it results in self-intersecting surfaces.

Two methods attempt to avoid this problem, Davis et al., 3DPVT, Padua, June 2002, in "Filling Holes in Complex Surfaces Using Volumetric Diffusion" developed a technique for filling holes by using a diffusion operation to expand the "signed distance function" defined by the existing points to complete a volumetric representation of the surface. But, the method lacks control over properties of the surface, like curvature, which leads to surfaces not matching the topology of the object being modeled (scanned) in some cases.

Correct topology may require additional information from the user, such as the original lines-of-sight used in scanning which may not be available, or in the case of holes created by a user modifying an object in a computer-aided design may never have existed.

Verdera et al., IEEE ICIP, September 2003, in "Inpainting Surface Holes" represented the surface of interest as the zero level-set of a function and then used a system of coupled geometric partial differential equations to smoothly continue the surface into the hole. This method suffers from the same lack of user control as the volumetric diffusion method. It also requires that the user provide the line-of-sight information that may not be available.

For hole-filling techniques integrated into surface reconstruction methods, Curless et al in "A Volumetric Method for Building Complex Models from Range Images", ACM SIGGRAPH 1996, converts each model mesh into a signed distance function whose zero set is the observed surface, blends these distance functions together and extracts the zero set as the final surface. However, the method does not operate properly if the scanner lines of sight do not adequately cover the volume outside the object.

Carr et al., ACM SIGGRAPH 2001, in "Reconstruction and Representation of 3D Objects with Radial Basis Functions" fits a set of radial basis functions to the data, and a weighted sum of these functions forms a new function, a level set of which is the intended surface. The method rebuilds the entire surfaces based on radial basis functions, rather than just operating on the region near the holes. Consequently, this method is slow especially for large models. For large models, such as urban scenes or complex large works of art, the computational time is impractical for building a model in time to be used for the application.

Similarly, Dey and Goswami, Solid Modeling, June 2003, in "Tight Cocone: A Water-tight Surface Reconstructor" produce a model without holes by using an alternative technique for rebuilding the model from the original points. In their method, a 3 dimensional Delauney triangulation of the points is computed. The time to perform this calculation increases as $N^{**}2$ for N points, making this approach not feasible for anything but relatively small point sets.

Therefore, a system and method are needed to fill in a surface in a hole left by inadequate data in a realistic manner and remain compatible with the original physical object. In addition, a system and method are needed for building a mesh for the points that are available in a scan, in a quick and efficient manner. The system and method also need to give the user easily specified parameters for operating on any remaining holes to produce a surface that is a faithful representation of the original object.

SUMMARY OF THE INVENTION

A method for hole-filling in 3D models includes identifying vertices adjacent to hole boundaries in a mesh of points on a digital image and constructing a signed distance function based on vertices adjacent to hole boundaries. A Radial Basis Function is fit based on the constructed signed distance function and evaluated on a grid, which include the hole. The points on the hole surface are extracted and meshed to fill the hole.

A system for hole-filling in 3D models includes a storage device, which stores a digital form of an image, and a processor, which graphically renders the image on a graphics subsystem. The system further includes a program which identifies points in the image and integrates a mesh between these points to define vertices adjacent to hole boundaries in the mesh. The program further includes a signed distance function which is constructed based on vertices adjacent to hole boundaries, and a Radial Basis Function which is fitted based on the constructed signed distance function. The Radial Basis Function is evaluated on a grid including one of the holes such that the hole is filled by extracting and meshing the points of the hole surface.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides a method and system for filing holes in models produced by machine vision or computer graphics systems. For purposes of this disclosure, a model is a numerical definition of an object's shape. In particular, models produced from data captured by physical measurements of real objects are considered in detail (although this method could be applied to any numerical model of a surface). Holes are identified in the object, and the surface points, or vertices around the holes are also identified.

Based on these points, a Radial Basis Function (RBF) is fitted for each hole, which is used to define a volume throughout space. Points lying on the implicit surface that pass through this volume, where the RBF is zero, are extracted. Any method can then be used to integrate these new points to the existing mesh to complete the hole-filling.

Before integration of the holes, to form a single surface, overlapping scans may be averaged. In stitching/zippering methods, this averaging is performed between pairs of overlapping meshes. In volumetric/occupancy grid methods line-of-sight errors are averaged by letting all scanned points contributed to a function that label nodes in a volume grid with their expected distance to the surface, with positive values outside of the surface, and negative values inside of the surface.

After correcting for line of sight errors, the scans are then integrated into a single mesh. The integration may be performed by zippering/stitching, isosurface extraction from volumes, or interpolating mesh algorithms applied to error-corrected points. An example of an interpolating mesh algorithm that runs very quickly because its run time is linear in the number of points is the Ball Pivoting Algorithm by Bernardini et al., IEEE TVCG, October-December 1999, and U.S. Pat. Ser. No. 09/549,432, both incorporated herein by reference.

In particular the ball-pivoting algorithm can be used to join the points into a triangle mesh. The shape of the interpolated hole surface can be controlled by the user by specifying parameters related to fitting the RBF to the distance function in the hole region.

One advantage of the present invention is the ability to control the shape in this manner. More importantly, the method is not restricted as far as the type of hole to be filled.

Unlike many previous algorithms, the method does not require that it be possible to project the hole onto a flat plane without the hole boundaries crossing one another, and does not restrict the topology of the filled-in surface.

The present method fills the holes in a cloud of points obtained for an object by a range scanner. These holes are mainly due to the fact that parts of the object-scanned surface may not have been reached by the scanner. The initial conditions for starting the processing are the existence of an integrated mesh for the scanned object. In a preferred embodiment, a scan generated by the BPA algorithm ((Ball Pivoting Algorithm by Bernardini et al., IEEE Transactions on Visualization and Computer Graphics, October-December 1999), incorporated previously by reference) may be employed.

After identifying the areas where there are holes, Radial Basis Functions (RBF), which have 3D interpolation properties, are fitted based on data on the hole boundaries. Data on the boundaries is used to make the filled-in shape compatible with the object shape. The user controls parameters related to fitting the RBF to a distance function in the hole region. These parameters give the user control over the shape of the filled hole.

The present invention includes the advantage that any method, including very fast (time linear in number of points) algorithms, can be used to form the initial integrated mesh. Another advantage is that the user has fine control over the way the holes are filled, and does not have to supply any information about how the scanned data was obtained. Finally, the method has the advantage that the filled surface will be smooth and not self-intersecting (manifold), and can have arbitrary topology, compatible with the original scanned surface.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces.

Figure 1A:
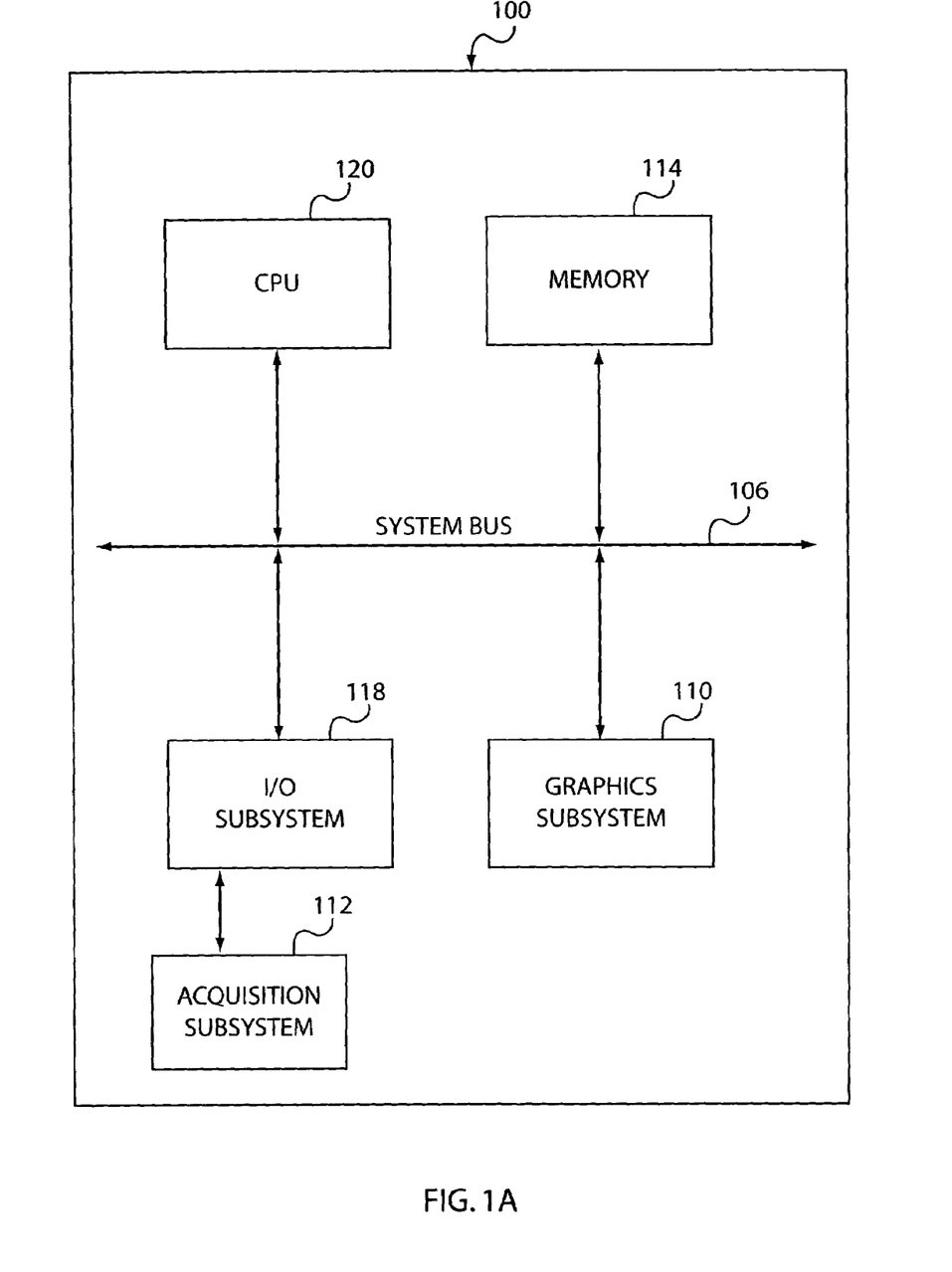
FIG. 1A is a block diagram of a computer system with graphics and 3D data acquisition capabilities for practicing the present invention.

Referring now to the drawings in which like numerals represent the same or similar elements and initially to FIG. 1A, a block/flow diagram of a computer system 100 with a graphics subsystem 110 and 3D data acquisition subsystem 112 are shown which are suitable for practicing the present invention.

A system bus 106 interconnects a CPU 120 (such as a Pentium-type microprocessor) with the graphic subsystem 110 and a system memory 114. The acquisition subsystem 112 is preferably, but not necessarily, interfaced through an I/O subsystem 118. The memory 114 can include or have loaded from a computer, readable medium that embodies a computer program for constructing or obtaining a digital model of an object in accordance with the teachings herein, in particular a computer program for constructing surfaces to fill in holes.

Acquisition subsystem 112 may include a plurality of different hardware/software implementations. Digital images may be acquired via digital photographs, images scanned through microscopes, digital X-rays, CAT scans, MRI, scanners or any other devices which can render digital images based on spatial relationships. These images can then be stored in memory 114 and be processed by CPU 120 to render them for display using the graphics subsystem 110.

Figure 1B:
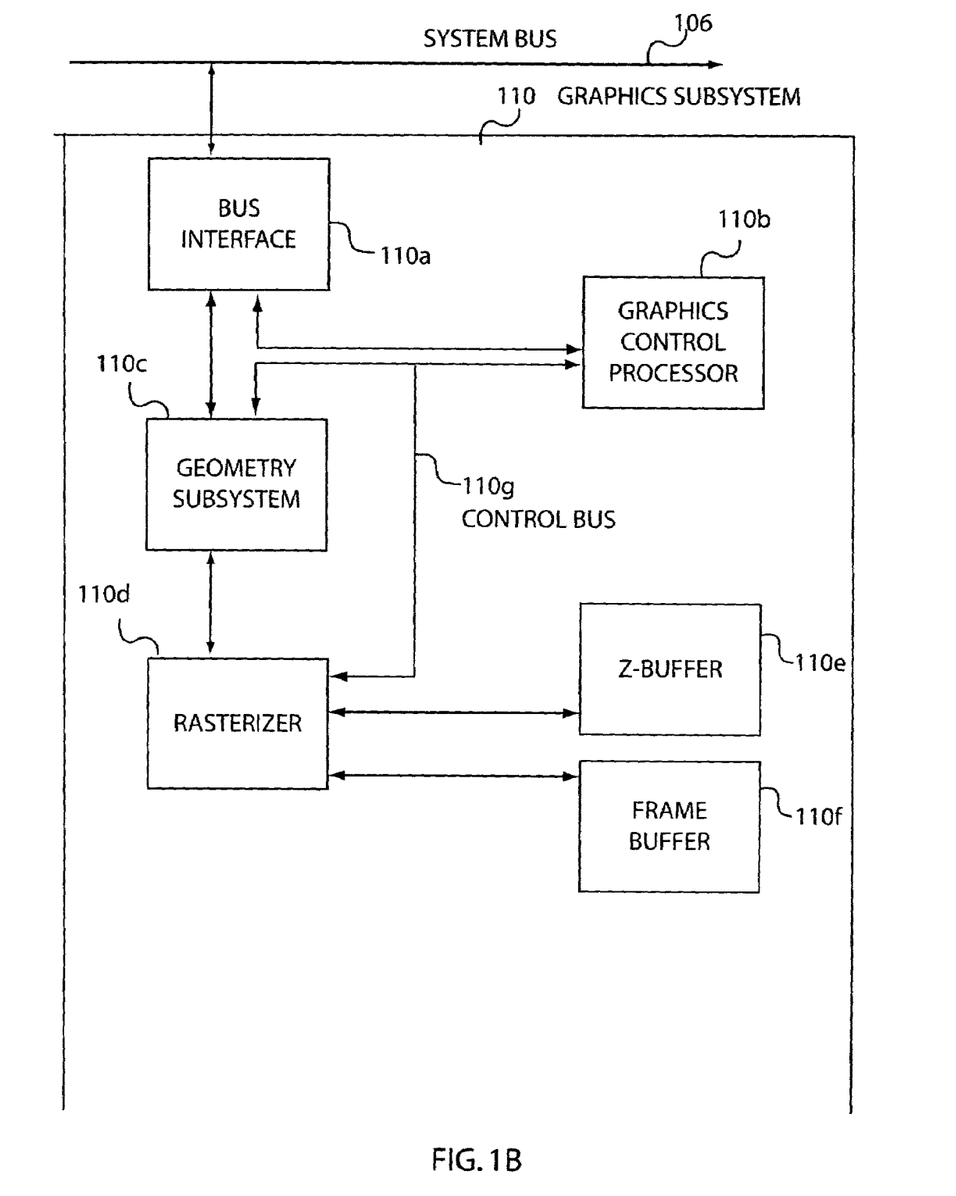
FIG. 1B shows a graphics subsystem in greater detail for practicing the present invention.

FIG. 1B shows the graphics subsystem 110 in greater detail. A bus interface 110a connects the system bus 106 to a graphics control processor 110b and to a geometry subsystem 110c. A graphics control processor 110b control bus 110g also connects to the geometry subsystem 110c and to a rasterizer 110d. A depth or z-buffer 110e and a frame buffer 110f are also coupled to the rasterizer 110d, and cooperate to render the object models for display.

The display may be necessary for a user to make decisions in setting parameters during the hole filling process.

Figure 1C:
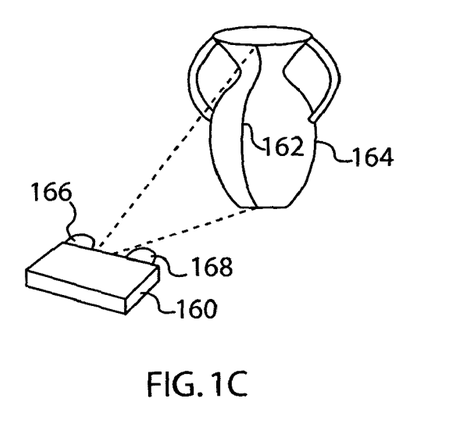
FIGS. 1C illustratively show the operation of a 3D scanner.
Figure 1D:
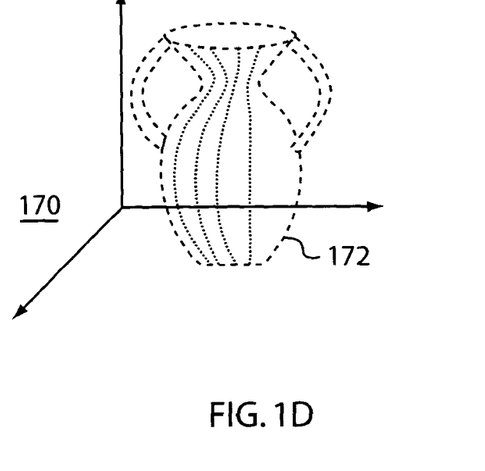
FIG. 1D shows the acquisition of points on the object of FIG. 1C.

Referring now to FIGS. 1C, an example of an acquisition system 112 (FIG. 1A) is shown in greater detail. A striping flash in a scanner 160 projects a set of stripes of light (structured light) 162 onto an object 164. The digital cameras 166 and 168 capture the shape of the stripes 162 from different angles. Digital image processing techniques are then used to compute the distance of each pixel on each stripe with respect to the sensor (cameras), as shown in FIG. 1D as stripes 172. For all but the simplest objects this process may be repeated from multiple viewpoints, so that the sensor can "see" every portion of the object's surface. The multiple scans are then registered, or aligned, into a single coordinate frame 170 as shown in FIG. 1D. The measured points can be seen as an unorganized "point cloud".

Figure 1E:
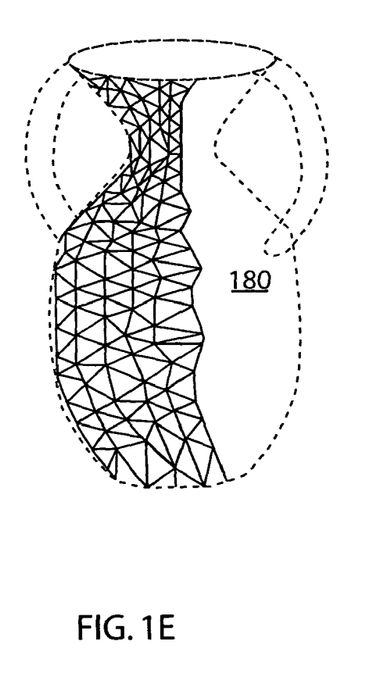
FIG. 1E shows a scan integration phase, and a computation of a triangular mesh of the object of FIG. 1E.

Next, in FIG. 1E, a scan integration phase forms a triangular mesh 180 that connects the measured points. The result of this operation is a 3D geometric model of the surface of the object 164. In subsequent operations, the mesh can be simplified, texture maps can be applied, or the triangular mesh can be converted to a curved surface representation (e.g., Non-Uniform Rational B-Splines (NURBS)).

Figure 1F:
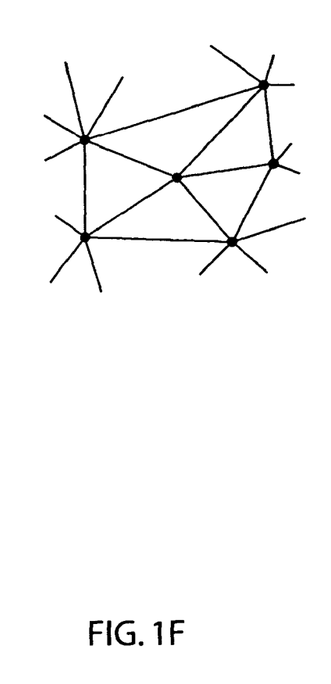
FIG. 1F shows a close up view of the computed mesh for the object of FIG. 1C.

FIG. 1F shows a close-up view of the computed triangular mesh of FIG. 1E.

Figure 2:
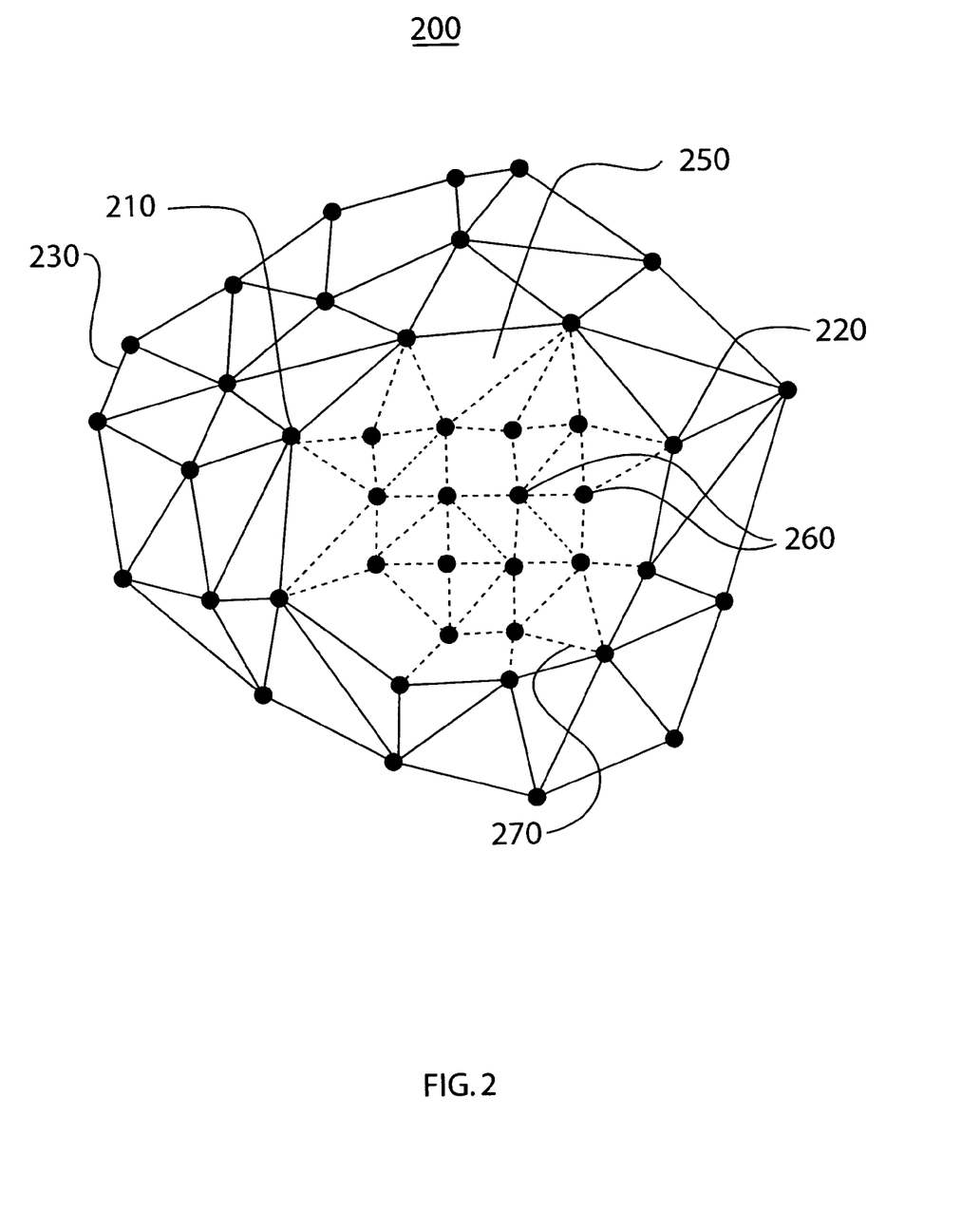
FIG. 2 shows a top view of a mesh shown with solid lines, with a hole in the mesh, the dashed lines show a surface filling in the hole in accordance with the present invention.

After the scan integration phase, holes may be left in the mesh. Referring to FIG. 2, a top view of a mesh 200 is shown with solid lines indicating triangle edges such as 230, having a hole 250 therein. Vertices 210 and 220 are located on the border of the hole 250. In accordance with the present invention, new vertices, such as 260, are added and are connected into additional triangles with edges indicated as dashed lines 270.

Figure 3:
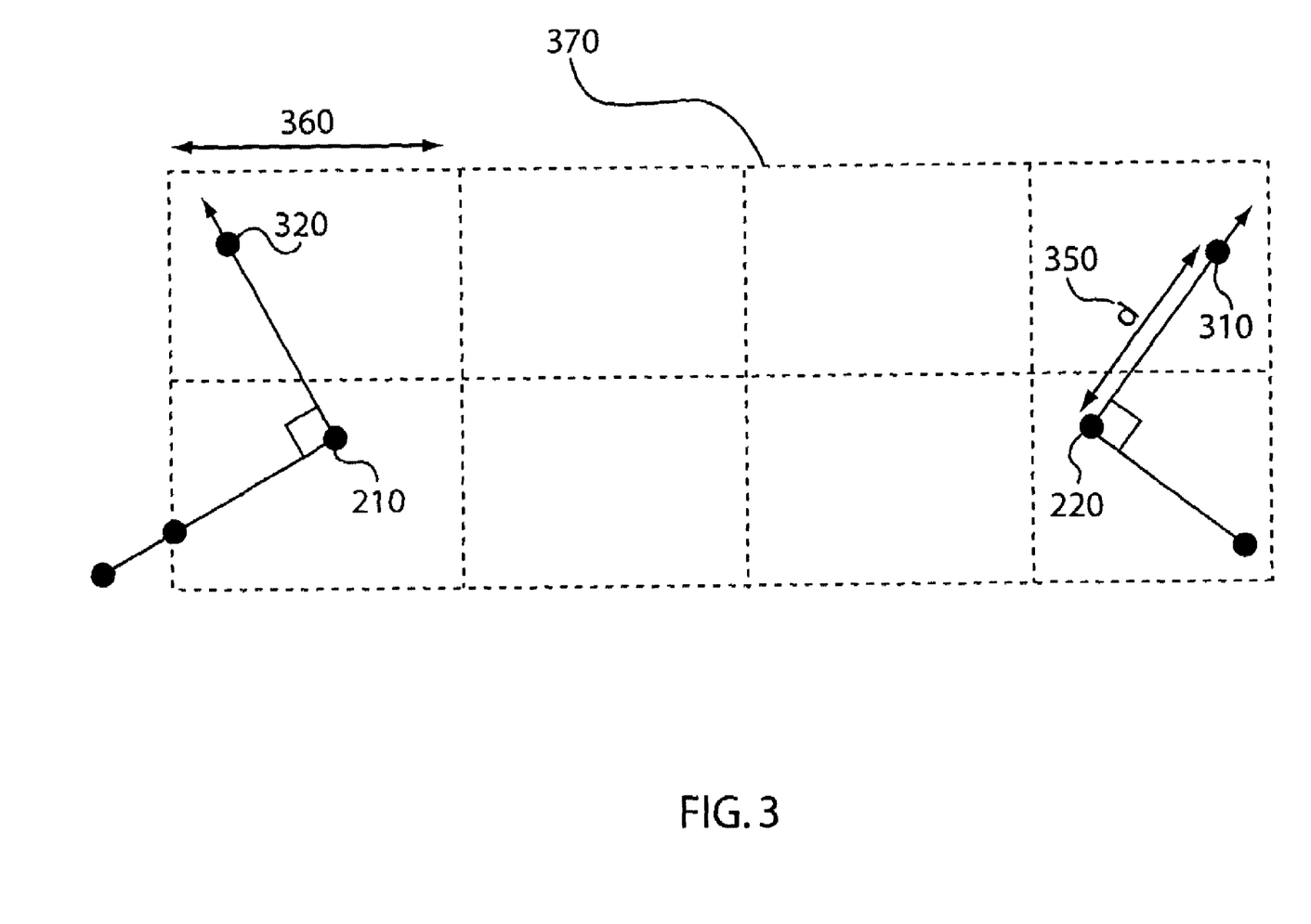
FIG. 3 shows a side view of the mesh of FIG. 2 and parameters used to control the filling in accordance with the present invention.

Referring to FIG. 3, a side view is depicted of a cut through the mesh shown in FIG. 2. To generate the missing points, data at vertices 210 and 220 will illustratively be used. Vertices 210 and 220 are defined to be "centers" for the solution, with a signed distance function of zero. Additional points, 310 and 320 are defined along the surface normals at 220 and 210. The surface normals are found using the data from points surrounding 210 and 220. The distance d (350) that points 310 and 320 are along the normals is specified by the user. The value of d is a positive signed distance, and 310 and 320 are defined to be "centers" with positive signed distance function d. These centers will be used to fit a Radial Basis Function, where interpolation is inherent in its functional representation, which will be evaluated on a grid 370. A resolution of the grid 360 is specified by the user. Controlling the distance 350 will permit the user to control the topology of the output surface. It may be specified as the same for all vertices, or may be varied. The resolution of grid 360, defines the detail of the interpolated/generated hole surface.

Figure 4:
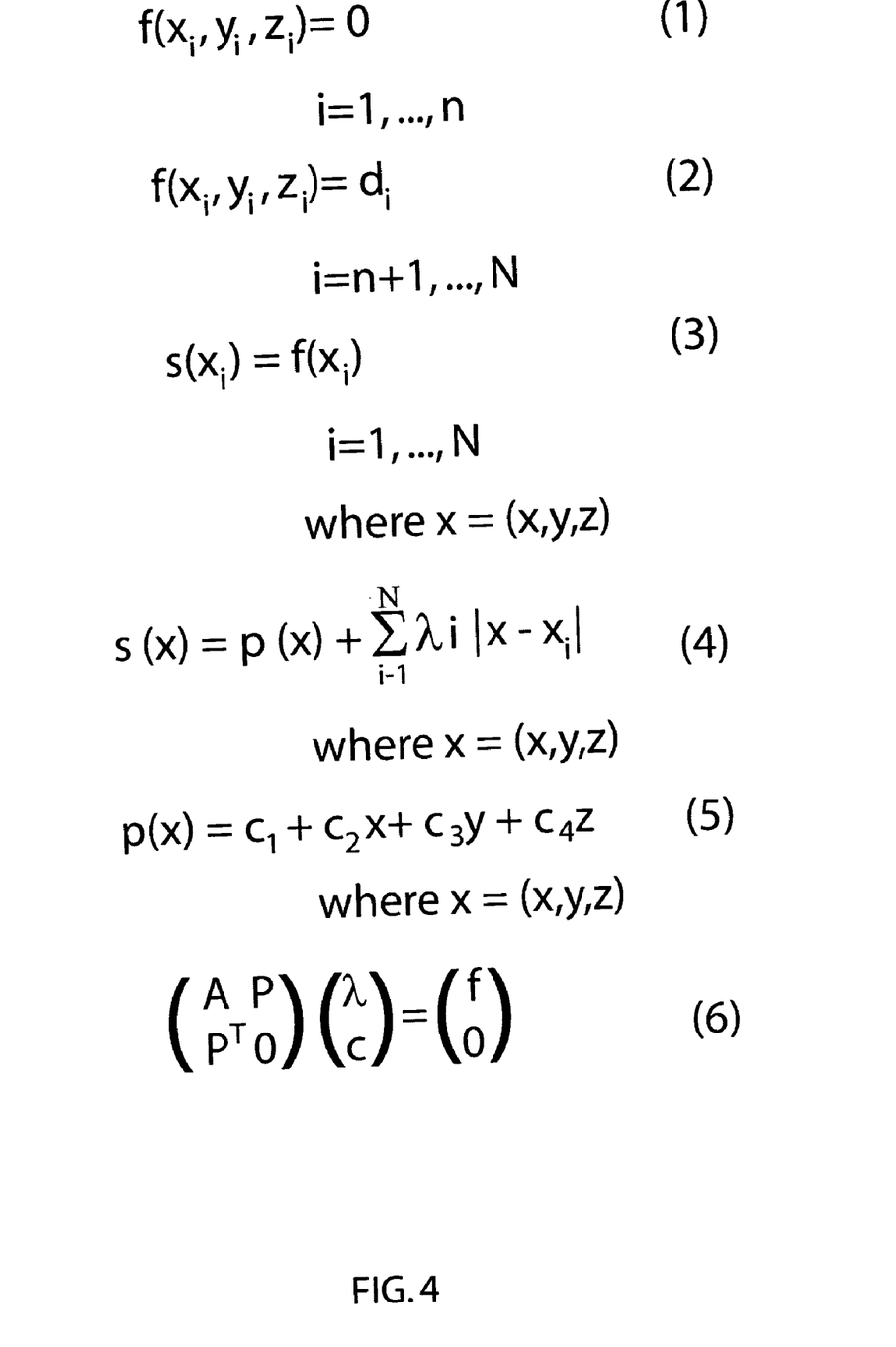
FIG. 4 shows equations useful in describing the hole-filling method in accordance with the present invention.

Referring to FIG. 4, equations used to define an illustrative Radial Basis Function for hole-filling are shown. Equation (1) states that the functional value f at the centers like 210 and 220 located on the surface should be zero. Equation (2) states that the functional value f at the off-surface points such as 310 and 320 should be equal to d (350). Equation (3) states that the radial basis functions used in filling the holes should be equal to f at the centers such as 210, 220, 310 and

320. Equation (4) gives the form of the interpolant s(x), which satisfies Equations (1) and (2). s(x), which is the sum of a polynomial p and a sum over all centers of constants $\lambda_i$ times the normal of the distance of point x from the center $x_i$. This function is a particular example of a Radial Basis Function (RFB), where the basic function is a biharmonic spline in 3D as in accordance with one preferred embodiment. To define the polynomial, the coefficients $c_1, c_2, c_3, c_4$ in Equation (5) need to be found. The unknown constants $\lambda$ and c are found by solving the set of simultaneous equations given in Equation (6), where A is a matrix in which the value for row I and column J is equal to the Euclidean distance between the centers $x_I$ and $x_J$.

Once the function s(x) is determined, the new points such as 260 in FIG. 2 are found by evaluating s(x) at the nodes of the grid 370 defined in the region of the hole 250. The points on the grid where the function s(x) has a value of zero given the new points such as 260. Any integration method, such as the ball-pivoting algorithm, can then be used to find the new edges such as 270 to join the new points to the existing mesh 200.

Figure 5:
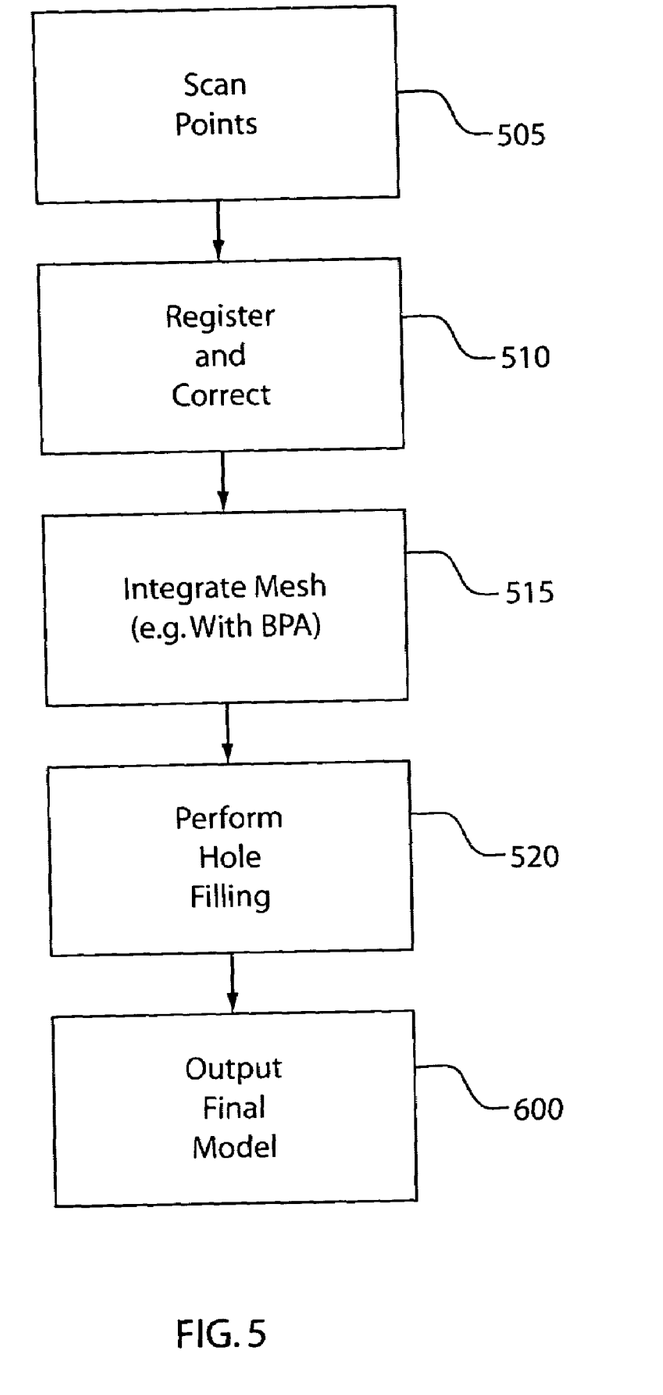
FIG. 5 is a block/flow diagram showing hole filling in accordance with an embodiment of the present invention.

Referring to FIG. 5, a block/flow diagram for employing hole-filling is shown in accordance with the present invention. Original points are obtained, for example, by scanning, in block 505. Obtaining the original points may be performed by using the computer system with graphics subsystem and acquisition shown in FIGS. 1A-F.

The scans are registered and corrected in block 510. In one embodiment, this may be performed by using manual methods followed by iterative line-of-sight error adjustment. In block 515, the points are then integrated into a single mesh, for example, using the ball pivoting algorithm. The hole-filling is performed in block 520, and the output mesh is produced in block 600.

Figure 6:
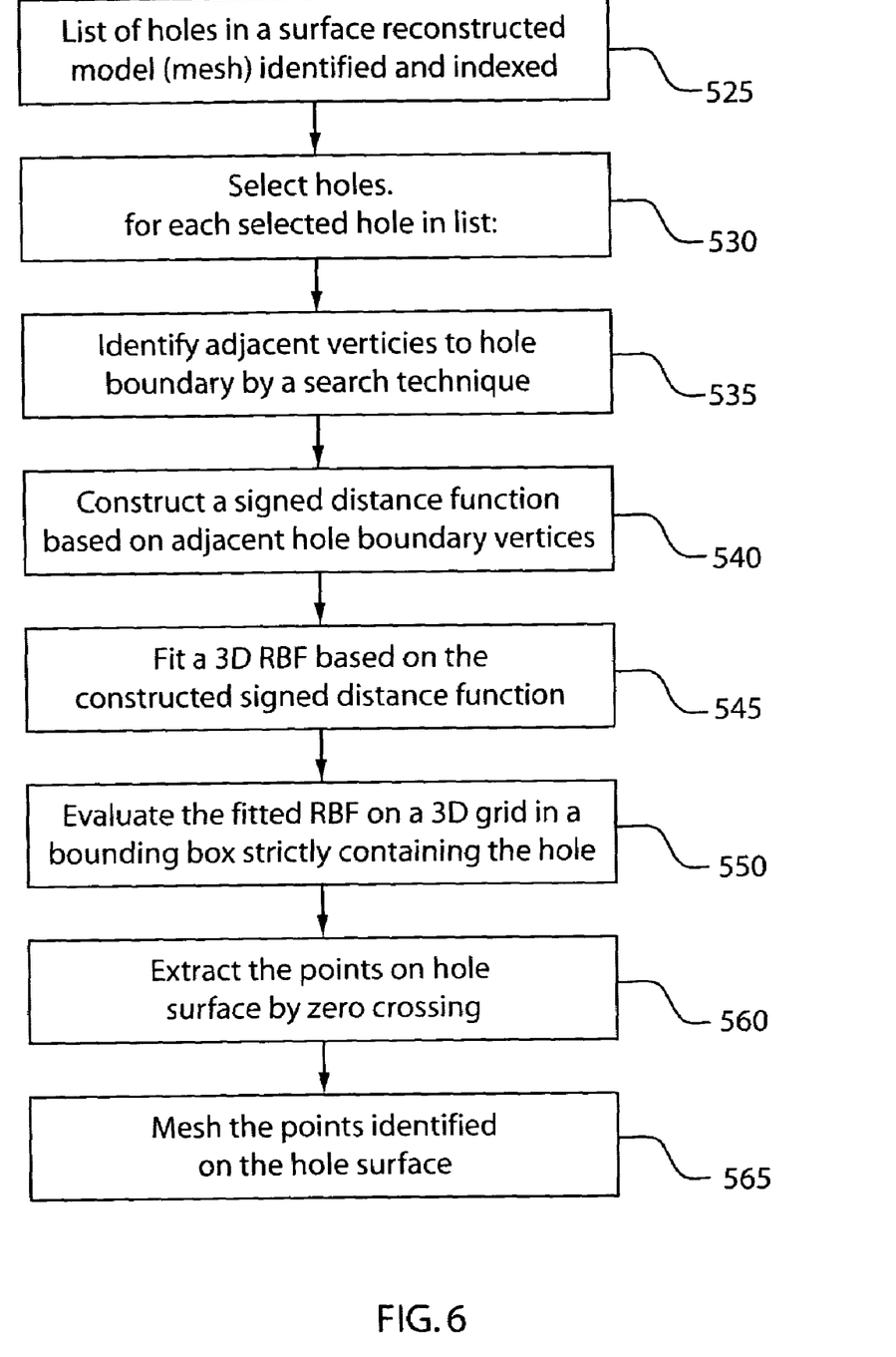
FIG. 6 is a block/flow diagram showing a hole filling in accordance with an embodiment of the present invention.

Referring to FIG. 6, a block/flow diagram shows greater details of the hole-filling process according to the present invention. It is to be noted that parameters may be selected automatically or manually by the end-user. These parameters will be described below.

Given an integrated mesh of a surface reconstructed model and a list of all holes existing in the mesh, the holes are first given index numbers and their approximate diameters, and the number of their boundary vertices is calculated in block 525.

The default is to fill all holes; however, holes can be selected for hole filling either manually or automatically by applying the above information in block 530. For all selected holes, the following steps are performed:

In block 535, identify the vertices of the model mesh, that are in the vicinity of the hole boundary vertices using any search technique, such as, for example, a breadth first search. The number of adjacent surrounding rows of vertices around the hole is a parameter preferably controlled by the end-user of the hole filling method. A range of surrounding vertices' rows can be assigned by the end-user. In this case, identified adjacent surrounding vertices' rows will be proportional to the approximate diameter of each hole.

In block 540, construct a signed distance function by assigning signed-distance values (e.g., negative for inside the model and positive for outside the model) to the vertices adjacent to the hole boundary vertices identified in block 535. The signed-distance value is a parameter that can be controlled by the end-user of the hole filling method.

In block 545, a 3D Radial Basis Function (RBF), that is the form s(x) given, for example, Equation 4 in FIG. 4, is fitted to the signed distance function constructed, in block 540. The RFB is fitted to the signed distance function, for example, by solving the set of simultaneous equations defined by Equation 6 in FIG. 4. RBF centers are selected regularly. A parameter, preferably controlled by the method end-user, is added to specify when RBF centers can be selected.

In block 550, evaluate the fitted Radial Basis Function on a 3D grid in a bounding box including the hole. The maximum and minimum grid step are parameters preferably controlled by the method end-user. A grid step is computed for each hole proportional to its size. The percentage increase of the bounding box edges' dimensions over the hole dimensions is also a parameter preferably controlled by the hole filling method end-user.

In block 560, extract the points lying on the implicit surface that passes through the volume where the Radial Basis Function is zero by using any extraction technique such as, for example, zero-crossing.

In block 565, mesh the points extracted in step 560, using any suitable meshing method, which interpolates the model missing surface of the hole. In a preferred embodiment, the ball-pivoting method is used. The results of hole filling described above are shown in FIG. 7.

Figure 7A:
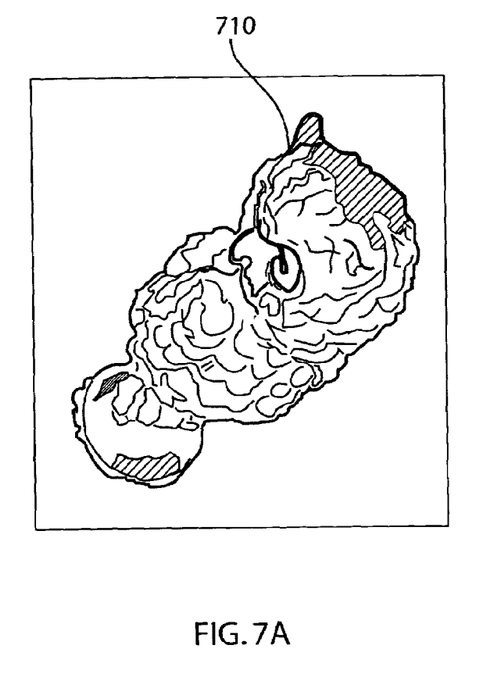
FIG. 7 shows a model before and after the hole-fill process in accordance with the present invention.
Figure 7B:
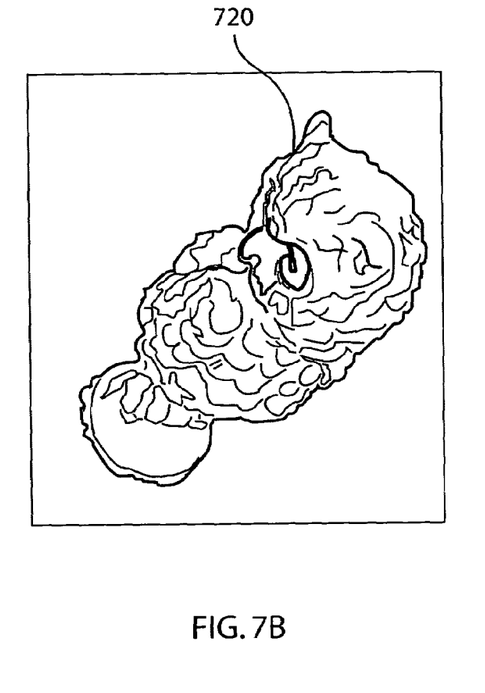

In FIG. 7A, image 710 shows the model before hole filling. There are holes on the top facing surfaces because no scans were taken from above the object. In FIG. 7B, image 720 shows the model after hole filling.

One of the key aspects of the present invention include that any fast method can be used to generate the initial mesh, no history of the scanning is needed, and the user has control over parameters to create an accurate shape.

Parameters such as the offset distance 350, and grid resolution 360 described with reference to FIG. 3 provide a user with additional control over the process. However, the offset distance and grid resolution are just two of the parameters that can be made available to the users. End-users can also control the hole-filling process by adjusting any of the hole-filling parameters described herein.

A description of these parameters and their impact on how holes are filled during hole-filling will now be described in accordance with the present invention. While these parameters are arbitrarily defined in text, the functions of these parameters may be combined or separated and renamed within the scope of the present invention.

a. Parameters related to the selection of holes to be filled
  mindiam: minimum hole approximate diameter
  maxdiam: maximum hole approximate diameter
  minbnd: minimum number of hole boundary points
  maxbnd: maximum number of hole boundary points
  gap: hole index
  geninf: generates hole information (holes' approximate diameters, holes' number of boundary points and holes' index numbers)
  skiplargest: excludes largest hole from filling Through these parameters the user can select the holes to be filled, which are the holes laying between mindiam and maxdiam or minbnd and maxbnd or having selected index numbers. Thereby, holes can be divided into different categories, if needed, and the filling of the holes of each category can be tuned according to the characteristics of each category.

For example, the end-user can generate the information related to the holes' approximate diameters, the holes number of boundary points and the holes' index numbers by adding the term '-geninf' to the hole filling command. The end-user can exclude the largest hole from computation by adding the term '-skiplargest' to the hole-filling command.

This is useful when the model is for a scanned object that is not closed, and there is a large hole corresponding to the part of the object that is not scanned.

b. Parameters related to tuning the filling of the selected holes minrnd: minimum number of vertices' rows around gaps
maxrnd: maximum number of vertices' rows around gaps
cntstp: step at which RBF centers are selected
minoffd: minimum signed distance off-surface value
maxoffd: maximum signed distance off-surface value
minstp: minimum grid step in bounding box containing the hole
maxstp: maximum grid step in bounding box containing the hole
dispX: increase, in x direction, of the bounding box surrounding the hole
dispY: increase, in y direction, of the bounding box surrounding the hole
dispZ: increase, in z direction, of the bounding box surrounding the hole Through minrnd and maxrnd the end-user can have control on how much of the surface characteristics surrounding a hole are taken into consideration when interpolating the hole surface by, for example, RBF. For complex surfaces, increasing the values of minrnd and maxrnd results in filling the holes with surfaces closely matching the topology of the object model. Increasing the values of minstp and maxstp results in larger number of hole implicit surface extracted points. Therefore, the end-user can obtain a smoother hole filled surface by selecting larger values of minstp and maxstp parameters, especially for large complex holes.

The 'cntstp' parameter integer values control the selection of the number of the centers of the fitted RBF. Small integer values of cntstp means more RBF centers and therefore more accurate RBF interpolation. It is to be understood that large values of minrnd, maxrnd, minstp, maxstp and cntstp increase the amount of computation needed. Therefore, the end-user should try not to excessively increase the values of these parameters.

To avoid obtaining left over tiny holes after filling large flat holes, the end-user should select large values for dispX, dispY and dispZ. But for non-flat holes, small values for these parameters help in avoiding flat surfaces surrounding the filled holes. To avoid obtaining distorted and intersected surfaces when filling a hole that folds closely over itself or when having holes very close to each other, end-users should select small values for minoffd and maxoffd parameters.

Another advantage of the present invention is that it does not need the user to specify the original lines-of-sight of the scanner to constrain the operation. Furthermore, the interpolation characteristics of Radial Basis Functions (RBF) as well as the scale independent smoothest interpolator characterization of polyharmonic splines, used as the basic function for RBF in the preferred embodiment, make the invented method particularly suited for fitting surfaces in partial meshes that include complex holes. Moreover, end-users have control of many parameters affecting the surface, which results in surfaces closely matching the modeled (scanned) object.

Having described preferred embodiments of a system and method for hole-filling in 3D models (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for hole-filling in 3D models, comprising the steps of:
    identifying vertices adjacent to hole boundaries in a mesh of points on a digital image;
    constructing a signed distance function based on vertices adjacent to hole boundaries;
    fitting a Radial Basis Function based on the constructed signed distance function;
    evaluating the fitted Radial Basis Function on a grid including the hole; and
    extracting and meshing the points on the hole surface to fill the hole.

2. The method as recited in claim 1, further comprising the step of generating a mesh using points of an image.

3. The method as recited in claim 2, further comprising the step of scanning an image using a Ball Pivoting Algorithm.

4. The method as recited in claim 1, further comprising the step of listing and indexing holes in the mesh.

5. The method as recited in claim 1, further comprising the step of scanning an object to generate the mesh.

6. The method as recited in claim 1, wherein the step of identifying vertices adjacent to hole boundaries includes employing a search algorithm.

7. The method as recited in claim 1, wherein the search algorithm includes employing a breadth first search.

8. The method as recited in claim 1, wherein the step of constructing a signed distance function includes:
    defining a distance function d for additional points, which lie on surface normals from vertices;
    evaluating a continuous distance function on a grid.

9. The method as recited in claim 7, wherein a value of a distance d between each additional point and its associated vertex controls a topology of an output surface, and further comprising the step of defining the value of distance d by a user.

10. The method as recited in claim 7, wherein a resolution of the grid defines the detail of generated surfaces, and further comprising the step of defining the resolution of the grid by a user.

11. The method as recited in claim 1, wherein fitting a Radial Basis Function based on the constructed signed distance function includes solving a set of simultaneous equations given by Equation 6.

12. The method as recited in claim 1, wherein the step of extracting is performed by a zero crossing method.

13. A system for hole-filling in 3D models, comprising:
    a storage device, which stores a digital form of an image;
    a processor, which graphically renders the image on a graphics subsystem;
    the system further comprising a program which identifies points in the image and integrates a mesh between these points to define vertices adjacent to hole boundaries in the mesh, the program further comprising:
    a signed distance function which is constructed based on vertices adjacent to hole boundaries;
    a Radial Basis Function which is fitted based on the constructed signed distance function, the Radial Basis Function being evaluated on a grid including one of the holes such that the hole is filled by extracting and meshing the points of the hole surface.

14. The system as recited in claim 13, wherein the mesh is generated using points of an image.

15. The system as recited in claim 13, further comprising an image acquisition device, which scans a digital image of an object to be modeled.

16. The system as recited in claim 13, wherein the program employs a Ball Pivoting Algorithm in scanning an image.

17. The system as recited in claim 13, wherein the program identifies vertices adjacent to hole boundaries by employing a search algorithm.

18. The system as recited in claim 17, wherein the search algorithm includes a breadth first search.

19. The system as recited in claim 13, wherein the signed distance function includes values of distances between additional points located on a surface normal from associated vertices, the values of distances to control a topology of an output surface.

20. The system as recited in claim 19, wherein the values of distances are user defined.

21. The system as recited in claim 13, wherein a resolution of the grid defines the detail of generated surfaces.

22. The system as recited in claim 21, wherein the resolution of the grid is user defined.

23. The system as recited in claim 13, wherein the Radial Basis Function includes the form of s(x) in Equation 4.

24. A program storage device readable by machine, tangibly embodying a program of instructions executable by the machine to perform method steps for hole-filling in 3D models, the method steps comprising:

identifying vertices adjacent to hole boundaries in a mesh of points on a digital image;

constructing a signed distance function based on vertices adjacent to hole boundaries;

fitting a Radial Basis Function based on the constructed signed distance function;

evaluating the fitted Radial Basis Function on a grid including one of the holes; and extracting and meshing the points on the hole surface to fill the hole.

25. The program storage device as recited in claim 24, further comprising the step of generating a mesh using points of an image.

26. The program storage device as recited in claim 24, further comprising the step of listing and indexing holes in the mesh.

27. The program storage device as recited in claim 24, wherein the step of identifying vertices adjacent to hole boundaries includes employing a search algorithm.

28. The program storage device as recited in claim 24, wherein the step of constructing a signed distance function includes:

defining a distance function d for additional points, which lie on surface normals from vertices;

evaluating a continuous distance function on a grid.

29. The program storage device as recited in claim 28, wherein a value of a distance d between each additional point and its associated vertex controls a topology of an output surface, and the value of distance d is defined by a user.

30. The program storage device as recited in claim 28, wherein a resolution of the grid defines the detail of generated surfaces, and the resolution of the grid is defined by a user.

31. The program storage device as recited in claim 24, wherein fitting a Radial Basis Function based on the constructed signed distance function includes solving a set of simultaneous equations given by Equation 6.

* * * * *